US012576650B2

(12) United States Patent
Ito

(10) Patent No.: US 12,576,650 B2
(45) Date of Patent: Mar. 17, 2026

(54) IMAGE RECORDING METHOD

(71) Applicant: FUJIFILM Corporation, Tokyo (JP)

(72) Inventor: Orie Ito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 240 days.

(21) Appl. No.: 18/458,656

(22) Filed: Aug. 30, 2023

(65) Prior Publication Data

US 2024/0116296 A1 Apr. 11, 2024

(30) Foreign Application Priority Data

Sep. 28, 2022 (JP) ................................ 2022-155425

(51) Int. Cl.

| | |
|---|---|
| ***B41J 11/00*** | (2006.01) |
| ***B41J 2/21*** | (2006.01) |
| ***B41M 5/00*** | (2006.01) |
| ***C09D 11/30*** | (2014.01) |

(52) U.S. Cl.

CPC ......... *B41J 11/0015* (2013.01); *B41J 2/2107* (2013.01); *B41M 5/0017* (2013.01); *C09D 11/30* (2013.01)

(58) Field of Classification Search

CPC ...................................................... B41J 2/2114

See application file for complete search history.

(56) References Cited

U.S. PATENT DOCUMENTS

| | | | | |
|---|---|---|---|---|
| 5,766,350 A * | 6/1998 | Becker | B05C 1/083 118/249 |
| 11,130,350 B2 | 9/2021 | Nozawa | |
| 2004/0119800 A1 | 6/2004 | Takada et al. | |
| 2008/0184930 A1 * | 8/2008 | Furukawa | B41J 11/0015 118/46 |
| 2010/0053239 A1 * | 3/2010 | Furukawa | B41J 2/14233 347/20 |
| 2012/0026239 A1 | 2/2012 | Yanagi | |
| 2013/0143008 A1 * | 6/2013 | Gotou | B41J 2/01 524/300 |
| 2013/0321525 A1 | 12/2013 | Fujii et al. | |
| 2015/0091974 A1 * | 4/2015 | Aoyama | B41J 2/2114 347/21 |
| 2021/0130639 A1 * | 5/2021 | Sugihara | B41J 2/01 |

FOREIGN PATENT DOCUMENTS

JP 2012-025911 A 2/2012

OTHER PUBLICATIONS

Extended European Search Report dated Feb. 9, 2024, issued in European Application No. 23196571.6.

* cited by examiner

*Primary Examiner* — Shelby L Fidler
(74) *Attorney, Agent, or Firm* — Sughrue Mion, PLLC

(57) ABSTRACT

An image recording method includes a step of applying a treatment liquid containing water and an aggregating agent to a permeable substrate to be transported, with a coating roller, and a step of applying an ink containing water, a water-soluble organic solvent, a colorant, and a resin to a region of the permeable substrate, which has been coated with the treatment liquid, by an ink jet method to record an image, in which, in a case where a diameter of the coating roller, expressed in mm unit, is defined as y and a viscosity of the treatment liquid at 25° C., expressed in mPa·s unit, is defined as x, x is 5 to 100 and a value of $y-25\ln(x)$ is 90 to 160.

13 Claims, No Drawings

IMAGE RECORDING METHOD

CROSS-REFERENCE TO RELATED APPLICATIONS

This application claims priority from Japanese Patent Application No. 2022-155425, filed Sep. 28, 2022, the disclosure of which is incorporated herein by reference in its entirety.

BACKGROUND OF THE INVENTION

1. Field of the Invention

The present disclosure relates to an image recording method.

2. Description of the Related Art

In recent years, an image recording method, which includes an ink applying step of applying an ink containing a coloring material and water to a recording medium and a treatment liquid applying step of applying a treatment liquid containing an aggregation component for aggregating the components in the ink to the recording medium, has been known (for example, refer to JP2012-25911A).

SUMMARY OF THE INVENTION

However, in an image recording method which includes a step of applying a treatment liquid containing water and an aggregating agent to a permeable substrate to be transported with a coating roller and a step of applying an ink containing water, a water-soluble organic solvent, a colorant, and a resin to a region of the permeable substrate, coated with the treatment liquid, by an ink jet method to record an image, density unevenness of the image may occur. One of causes of the density unevenness of the image is considered to be a coating unevenness of the treatment liquid applied to the permeable substrate prior to the ink. One of causes of the coating unevenness of the treatment liquid is considered to be variation in how easily the treatment liquid is separated from an outer peripheral surface of the coating roller (specifically, variation in a position of the coating roller in a rotation axis direction).

The coating unevenness of the treatment liquid and the density unevenness of the image due to the coating unevenness of the treatment liquid tend to be apparent as an application speed of the treatment liquid during coating (that is, a transportation speed of the permeable substrate) increases.

The present disclosure has been made in consideration of the above-described circumstances.

An object of one aspect of the present disclosure is to provide an image recording method capable of recording an image in which density unevenness is suppressed on a permeable substrate.

The specific methods for achieving the above-described object include the following aspects.

<1> An image recording method comprising:

a step of applying a treatment liquid containing water and an aggregating agent to a permeable substrate to be transported, with a coating roller; and a step of applying an ink containing water, a water-soluble organic solvent, a colorant, and a resin to a region of the permeable substrate, which has been coated with the treatment liquid, by an ink jet method to record an image, in which, in a case where a viscosity of the treatment liquid at 25° C., expressed in mPa·s unit, is defined as x and a diameter of the coating roller, expressed in mm unit, is defined as y, x is 5 to 100 and a value of y−25 ln(x) is 90 to 160.

<2> The image recording method according to <1>, in which the aggregating agent is an organic acid salt.

<3> The image recording method according to <2>, in which the organic acid salt is an alkali metal salt of an organic acid or an alkaline earth metal salt of an organic acid.

<4> The image recording method according to <3>, in which the organic acid is an organic compound having a phosphoric acid group or a carboxy group.

<5> The image recording method according to <1>, in which the aggregating agent is an organic acid.

<6> The image recording method according to <5>, in which the organic acid is an organic compound having a phosphoric acid group or a carboxy group.

<7> The image recording method according to any one of <1> to <6>, in which a content of the aggregating agent in the treatment liquid is 0.1% by mass to 30% by mass with respect to the total amount of the treatment liquid.

<8> The image recording method according to any one of <1> to <7> in which a ratio of an applied mass of the treatment liquid to an applied mass of the ink is 0.05 to 0.50 in the region to which the ink has been applied.

<9> The image recording method according to any one of <1> to <8>, in which the value of y−25 ln(x) is 100 to 160.

<10> The image recording method according to any one of <1> to <9>, wherein the water-soluble organic solvent is at least one selected from the group consisting of a diethylene glycol monoalkyl ether, a triethylene glycol monoalkyl ether, a propylene glycol monoalkyl ether, dipropylene glycol, tripropylene glycol, and a tripropylene glycol monoalkyl ether <11> The image recording method according to any one of <1> to <10>, in which the permeable substrate includes paper.

<12> The image recording method according to any one of <1> to <11>, in which a transportation speed of the permeable substrate during applying the treatment liquid is 50 m/min or more.

According to one aspect of the present disclosure, there is provided an image recording method capable of recording an image in which density unevenness is suppressed on a permeable substrate.

DESCRIPTION OF THE PREFERRED EMBODIMENTS

In the present disclosure, the numerical ranges shown using "to" means ranges including the numerical values described before and after "to" as the minimum value and the maximum value.

In the present disclosure, in a case where a plurality of substances corresponding to each component in a composition is present, the amount of each component in the composition means the total amount of the plurality of substances present in the composition, unless otherwise specified.

In a numerical range described in a stepwise manner in the present disclosure, an upper limit value or a lower limit value described in a certain numerical range may be replaced with an upper limit value or a lower limit value in another numerical range described in a stepwise manner, or may be replaced with values shown in Examples.

In the present disclosure, the term "step" includes not only the independent step but also a step in which intended purposes are achieved even in a case where the step cannot be precisely distinguished from other steps.

The term "solid content" in the present disclosure means a component excluding a solvent, and a liquid component such as a low molecular weight component other than a solvent is also included in the "solid content" in the present specification.

The term "solvent" in the present disclosure is used to include water, an organic solvent, and a mixed solvent of water and an organic solvent.

In the present disclosure, either or both of acrylic and methacrylic may be referred to as "(meth)acrylic". For example, "(meth)acrylic acid" includes both acrylic acid and methacrylic acid.

In the present disclosure, either or both of acrylate and methacrylate may be referred to as "(meth)acrylate".

The weight-average molecular weight (Mw) and the number-average molecular weight (Mn) in the present disclosure are measured by gel permeation chromatography (GPC).

With the gel permeation chromatography, HLC-8220GPC (manufactured by TOSOH CORPORATION) is used as the GPC, three columns, TSKgeL Super HZ2000, TSKgeL Super HZ4000, and TSKgeL Super HZ-H (all manufactured by TOSOH CORPORATION, 4.6 mm×15 cm) are connected in series, and NMP (N-methylpyrrolidone) is used as an eluent. The sample concentration is 0.3% by mass, the flow rate is 0.35 ml/min, the sample injection amount is 10 μL, the measurement temperature is 40° C., and the refractive index (RI) detector (differential refractive index detector) is used as a detector. The calibration curve is prepared using 6 samples of "F-80", "F-20", "F-4", "F-2", "A-5000", and "A-1000", which are "Standard Sample TSK standard, polystyrene" manufactured by TOSOH CORPORATION.

Image Recording Method

The image recording method according to the embodiment of the present disclosure includes

- a step (hereinafter, also referred to as "treatment liquid applying step") of applying a treatment liquid containing water and an aggregating agent to a permeable substrate to be transported, with a coating roller; and
- a step (hereinafter, also referred to as "ink applying step") of applying an ink containing water, a water-soluble organic solvent, a colorant, and a resin to a region of the permeable substrate, which has been coated with the treatment liquid, by an ink jet method to record an image,
- in which, in a case where a viscosity of the treatment liquid at 25° C., expressed in mPa·s unit, is defined as x and a diameter of the coating roller, expressed in mm unit, is defined as y, x is 5 to 100 and a value of y−25 ln(x) (that is, a value of a relational expression "y−25 ln(x)") is 90 to 160.

The image recording method according to the embodiment of the present disclosure may include other steps, as necessary.

According to the image recording method according to the embodiment of the present disclosure, it is possible to record an image in which density unevenness is suppressed.

The reason why such an effect is exhibited is presumed as follows.

The image recording method according to the embodiment of the present disclosure is included in the scope of an image recording method (hereinafter, referred to as "recording method A") including a step of applying a treatment liquid containing water and an aggregating agent to a permeable substrate to be transported with a coating roller and a step of applying an ink containing water, a water-soluble organic solvent, a colorant, and a resin to a region of the permeable substrate, coated with the treatment liquid, by an ink jet method to record an image. In the recording method A, the image recording method according to the embodiment of the present disclosure is an image recording method with the limitation that x is 5 to 100 and a value of y−25 ln(x) is 90 to 160.

In the image recording method according to the embodiment of the present disclosure, it is considered that density unevenness of the image due to coating unevenness of the treatment liquid, which is a problem specific to the recording method A (particularly, an image recording method in which the treatment liquid is applied with a coating roller), is suppressed.

In the recording method A, in a case where the coating unevenness of the treatment liquid occurs, it is considered that, depending on this coating unevenness, unevenness occurs in the degree of aggregation of the ink applied to the treatment liquid, and as a result, the density unevenness of the image occurs.

In the recording method A, it is considered that the coating unevenness of the treatment liquid relates to a viscosity of the treatment liquid (specifically, "x" in the present disclosure) and a diameter of the coating roller (specifically, "y" in the present disclosure).

Specifically, as the viscosity (x) of the treatment liquid is larger, there is a tendency for coating unevenness of the treatment liquid to occur.

As the diameter (y) of the coating roller is smaller, there is a tendency for coating unevenness of the treatment liquid to occur.

In studying the conditions of the recording method A, the present inventor has found that the coating unevenness of the treatment liquid can be suppressed by limiting x to 100 or less and the value of the relational expression "y−25 ln(x)" to 90 or more.

The image recording method according to the embodiment of the present disclosure is based on the above-described findings.

Specifically, in the image recording method according to the embodiment of the present disclosure, since the x is 100 or less and the value of the relational expression "y−25 ln(x)" is 90 or more, the viscosity (x) of the treatment liquid is prevented from being too large and the diameter (y) of the coating roller is prevented from being too small, and as a result, it is considered that the coating unevenness of the treatment liquid is suppressed (refer to Examples and Comparative Examples 2 and 3 described later).

In addition, in a case where x is less than 5, although the effect on coating unevenness of the treatment liquid is small, the application amount of the treatment liquid applied to the permeable substrate tends to be insufficient, and as a result, it is considered that the density unevenness of the image occurs (refer to Comparative Example 1 described later).

As described above, according to the image recording method according to the embodiment of the present disclosure, it is considered that the coating unevenness of the treatment liquid is suppressed, and as a result, the density unevenness of the image due to the coating unevenness of the treatment liquid is suppressed.

Value of Relational Expression "y−25 ln(x)"

In the present disclosure, the value of the relational expression "y−25 ln(x)" is 90 to 160.

Since the value of the relational expression "y−25 ln(x)" is 90 or more, the coating unevenness of the treatment liquid is suppressed, and as a result, the density unevenness of the image due to the coating unevenness of the treatment liquid is suppressed.

The upper limit 160 of the value of the relational expression "y−25 ln(x)" is an upper limit which is set in consideration of practicability (for example, restrictions on the size of an image recording device, and the like) rather than the coating unevenness of the treatment liquid and the density unevenness of the image.

The value of the relational expression "y−25 ln(x)" is preferably 100 to 160.

Viscosity (x) of Treatment Liquid

In the present disclosure, the viscosity (x) of the treatment liquid (that is, a viscosity of the treatment liquid at 25° C., expressed in mPa·s unit) is 5 to 100.

Since x is 5 or more, the density unevenness of the image is suppressed.

Since x is 100 or less, the coating unevenness of the treatment liquid and the density unevenness of the image are suppressed.

x is preferably 10 to 90 and more preferably 10 to 80.

In the present disclosure, the viscosity (x) of the treatment liquid means a value measured using a viscometer (for example, VISCOMETER TV-22 (manufactured by TOKI SANGYO CO. LTD.)) under a condition of 25° C.

Diameter (y) of Coating Roller

In the present disclosure, the diameter (y) of the coating roller is not particularly limited as long as the values of x and "y−25 ln(x)" are within the above-described range.

y is preferably 100 to 300, more preferably 120 to 300, even more preferably 140 to 270, and still more preferably 180 to 220.

Hereinafter, each step of the image recording method according to the embodiment of the present disclosure will be described.

Treatment Liquid Applying Step

The treatment liquid applying step is a step of applying a treatment liquid containing water and an aggregating agent to a permeable substrate to be transported, with a coating roller.

Permeable Substrate

In the image recording method according to the embodiment of the present disclosure, the treatment liquid and the ink are sequentially applied to the permeable substrate, and an image is recorded on the permeable substrate.

In the present disclosure, the permeable substrate refers to a substrate having a water absorption rate (unit: % by mass, measurement time: 24 hours) of 0.2 or more in ASTM D570 which is an ASTM test method.

From the viewpoint of further improving image quality of the image, the permeable substrate preferably has a water absorption coefficient Ka of 0.05 $mL/m^2 \cdot ms^{1/2}$ or more.

The water absorption coefficient Ka of the permeable substrate is more preferably 0.05 $mL/m^2 \cdot ms^{1/2}$ to 0.5 $mL/m^2 \cdot ms^{1/2}$, still more preferably 0.1 $mL/m^2 \cdot ms^{1/2}$ to 0.4 $mL/m^2 \cdot ms^{1/2}$, and even more preferably 0.2 $mL/m^2 \cdot ms^{1/2}$ to 0.3 $mL/m^2 \cdot ms^{1/2}$.

The water absorption coefficient Ka is synonymous with that described in JAPAN TAPPI Pulp and Paper Test Method No. 51: 2000 (Published by Japan Technical Association of the Pulp and Paper). The absorption coefficient Ka is a value calculated from the difference in the amount of water transferred between a contact time of 100 ms and a contact time of 900 ms using an automatic scanning liquid absorptometer KM500Win (manufactured by KUMAGAI RIKI KOGYO Co., Ltd.).

The permeable substrate preferably includes paper.

In this case, the permeable substrate may be a permeable substrate only consisting of paper (for example, high-quality paper, alkaline paper, and the like), or may be a permeable substrate including paper and a coating layer (for example, art paper, coated paper, lightweight coated paper, fine coated paper, and the like).

The coating layer preferably contains an inorganic pigment.

The inorganic pigment is not particularly limited, but at least one selected from silica, kaolin, clay, calcined clay, zinc oxide, tin oxide, magnesium sulfate, aluminum oxide, aluminum hydroxide, pseudo-boehmite, calcium carbonate, heavy calcium bicarbonate, satin white, aluminum silicate, smectite, zeolite, magnesium silicate, magnesium carbonate, magnesium oxide, or diatomite is preferable, and calcium carbonate, heavy calcium bicarbonate, silica, or kaolin is more preferable.

A commercially available product may be used as the permeable substrate including paper.

Examples of the commercially available product include:

- high-quality paper (A) such as "OK Prince High Quality" manufactured by Oji Paper Co., Ltd., "Shiraoi" manufactured by Nippon Paper Industries Co., Ltd., and "New NPI high-quality" manufactured by Nippon Paper Industries Co., Ltd.;
- high-quality coated paper such as "Silver diamond" manufactured by Nippon Paper Industries Co., Ltd.;
- fine coated paper such as "OK Everlight Coat" manufactured by Oji Paper Co., Ltd. and "Aurora S" manufactured by Nippon Paper Industries Co., Ltd.;
- lightweight coated paper (A3) such as "OK Coat L" manufactured by Oji Paper Co., Ltd. and "Aurora L" manufactured by Nippon Paper Industries Co., Ltd.;
- coated paper (A2, B2) such as "OK Top Coat+" manufactured by Oji Paper Co., Ltd. and "Aurora Coat" manufactured by Nippon Paper Industries Co., Ltd.;
- art paper (A1) such as "OK Kanto+" manufactured by Oji Paper Co., Ltd. and "Tokubishi Art" manufactured by Mitsubishi Paper Mills Limited;
- various photographic papers for ink jet recording;
- "Bonivory" manufactured by Oji Paper Co., Ltd.;
- "Carolina C2S" manufactured by International Paper;
- "Carta Integra" manufactured by Metsaboard;
- "VJFP series" manufactured by YUPO CORPORATION; and
- "MAGNO (registered trademark) Gross" which is coated paper manufactured by Sappi.

Transportation Speed of Permeable Substrate (Application Speed of Treatment Liquid)

In the above-described recording method A, the coating unevenness of the treatment liquid and the density unevenness of the image due to the coating unevenness of the treatment liquid tend to be apparent as a transportation speed of the permeable substrate during applying the treatment liquid (hereinafter, also referred to as "application speed of the treatment liquid") increases.

In particular, in a case where the application speed of the treatment liquid is 50 m/min or more, the coating unevenness of the treatment liquid and the density unevenness of the image tend to be remarkable in the recording method A.

Therefore, in the image recording method according to the embodiment of the present disclosure, in a case where the application speed of the treatment liquid is 50 m/min or more, the effect of specifying x and "y−25 ln(x)" is more effectively exhibited.

From the above points, the application speed of the treatment liquid (that is, the transportation speed of the permeable substrate during applying the treatment liquid) in the image recording method according to the embodiment of the present disclosure is preferably 50 m/min or more and more preferably 60 m/min or more.

Further, in consideration of restrictions on the device, the application speed of the treatment liquid is preferably 50 m/min to 350 m/min, and more preferably 60 m/min to 300 m/min.

Coating Roller

In the image recording method according to the embodiment of the present disclosure, a coating roller is used for applying the treatment liquid.

In the applying of the treatment liquid using the coating roller, the treatment liquid applied to an outer peripheral surface of the coating roller is transferred to the permeable substrate.

The coating roller can be selected from known coating rollers.

The preferred range of the diameter (y) of the coating roller is as described above.

Examples of a material of the outer peripheral surface of the coating roller include rubbers such as ethylene-propylene-diene rubber (EPDM) and silicon rubber.

Examples of a material other than the outer peripheral surface of the coating roller include a metal such as stainless steel.

The coating roller may be used together with a supply roller (for example, an anilox roller) for supplying the treatment liquid to the outer peripheral surface of the coating roller.

Applied Mass of Treatment Liquid

An applied mass (that is, an applied amount) of the treatment liquid to the permeable substrate is not particularly limited.

The applied mass of the treatment liquid is preferably 0.1 $g/m^2$ to 10 $g/m^2$, more preferably 0.5 $g/m^2$ to 6.0 $g/m^2$, even more preferably 1.0 $g/m^2$ to 4.0 $g/m^2$, and still more preferably 1.5 $g/m^2$ to 3.0 $g/m^2$.

Heating and Drying of Treatment Liquid

In the treatment liquid applying step, the treatment liquid applied to the permeable substrate may be heated and dried.

Examples of a unit for heating and drying the treatment liquid include known heating units such as a heater, known blowing units such as a dryer, and units combining these.

Examples of a method of heating and drying the treatment liquid include

- a method applying heat using a heater or the like to a surface of the permeable substrate opposite to a surface to which the treatment liquid is applied;
- a method of blowing warm air or hot air to the surface of the permeable substrate to which the treatment liquid is applied;
- a method of applying heat using an infrared heater to the surface of the permeable substrate to which the treatment liquid is applied or to a surface of the permeable substrate opposite to the surface to which the treatment liquid is applied; and
- a method of combining a plurality of these methods.

The heating temperature during the heating and drying of the treatment liquid is preferably 35° C. or higher, and more preferably 40° C. or higher.

The upper limit of the heating temperature is not particularly limited, but for example, the upper limit can be 100° C., preferably 70° C. and more preferably 60° C.

The time for heating and drying the ink is not particularly limited, but is preferably 0.5 seconds to 60 seconds, more preferably 0.5 seconds to 20 seconds, and particularly preferably 0.5 seconds to 10 seconds.

Treatment Liquid

The treatment liquid in the present disclosure contains water and an aggregating agent.

—Water—

The treatment liquid in the present disclosure contains water.

A content of the water is not particularly limited, but is preferably 10% by mass or more, more preferably 30% by mass or more, and still more preferably 50% by mass or more with respect to the total amount of the treatment liquid.

The upper limit of the content of the water depends on contents of other components, but is, for example, 99% by mass, 90% by mass, 80% by mass, or the like.

—Aggregating Agent—

The treatment liquid in the present disclosure contains at least one aggregating agent.

The aggregating agent is a compound which aggregates components in the ink.

By applying the treatment liquid and the ink to the permeable substrate in this order, and then recording the image, the components in the ink are aggregated by the aggregating agent in the treatment liquid, and an image having excellent image quality is obtained.

Examples of the aggregating agent include known aggregating agents described in WO2019/004485A, WO2019/150878A, and WO2019/163581A.

Examples of the aggregating agent include an organic acid, an organic acid salt, a polyvalent metal compound, a metal complex, and a cationic polymer.

—Organic Acid—

Examples of the organic acid include an organic compound having an acidic group.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, as the acidic group, a phosphoric acid group or a carboxy group is preferable, and a carboxy group is more preferable.

Examples of the organic compound containing a carboxy group as the organic acid include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, and nicotinic acid.

Among these, formic acid, acetic acid, or lactic acid is preferable.

—Organic Acid Salt—

Examples of the organic acid salt include salts of the above-described organic acids.

As the salt, an alkali metal salt or an alkaline earth metal salt is preferable, and a sodium salt, a potassium salt, a magnesium salt, or a calcium salt is more preferable.

As the organic acid salt, sodium formate, potassium formate, calcium formate, sodium acetate, potassium acetate, calcium acetate, sodium lactate, potassium lactate, or calcium lactate is preferable, and calcium formate is most preferable.

For the polyvalent metal compound, the metal complex, and the cationic polymer, for example, description in paragraphs 0122 to 0130 of WO2020/195360A can be referred to.

From the viewpoint that the effects of the image recording method according to the embodiment of the present disclosure can be effectively achieved, an organic acid salt is particularly preferable as the aggregating agent.

A content of the aggregating agent in the treatment liquid is preferably 0.1% by mass to 30% by mass, more preferably 1% by mass to 20% by mass, and still more preferably 1% by mass to 10% by mass with respect to the total amount of the treatment liquid.

—Water-Soluble Organic Solvent—

The treatment liquid in the present disclosure may contain at least one water-soluble organic solvent.

As a result, a surface tension of the treatment liquid is reduced, and application suitability (for example, coating suitability) of the treatment liquid is improved.

Definition of “water-soluble” will be described later.

From the viewpoint of further suppressing image streaks and bleeding, it is more preferable that the water-soluble organic solvent in the treatment liquid includes an organic solvent S1 which is at least one selected from the group consisting of.

- diethylene glycol monoalkyl ether (preferably, diethylene glycol monoalkyl ether in which an alkyl group in an alkyl ether structure has 1 to 6 carbon atoms (for example, diethylene glycol monobutyl ether));
- triethylene glycol monoalkyl ether (preferably, triethylene glycol monoalkyl ether in which an alkyl group in an alkyl ether structure has 1 to 6 carbon atoms (for example, triethylene glycol monomethyl ether));
- propylene glycol monoalkyl ether (preferably, propylene glycol monoalkyl ether in which an alkyl group in an alkyl ether structure has 1 to 6 carbon atoms (for example, propylene glycol monomethyl ether));
- dipropylene glycol;
- tripropylene glycol; and
- tripropylene glycol monoalkyl ether (preferably, tripropylene glycol monoalkyl ether in which an alkyl group in an alkyl ether structure has 1 to 6 carbon atoms (for example, tripropylene glycol monomethyl ether)).

The organic solvent S1 is a water-soluble organic solvent that is hydrophobic (that is, has a low solvent parameter (SP) value) as compared with alkylene glycol (for example, propylene glycol) which is another example of the water-soluble organic solvent. In a case where the water-soluble organic solvent in the treatment liquid contains such an organic solvent S1, as compared with a case where the water-soluble organic solvent in the treatment liquid does not contain the organic solvent S1 but contains alkylene glycol, it is considered that film quality of a film (that is, an image) formed for the ink is improved, and as a result, the streaks and bleeding of the image are further suppressed.

A proportion of the organic solvent S1 in the water-soluble organic solvent in the treatment liquid is preferably 50% by mass to 100% by mass, more preferably 60% by mass to 100% by mass, and still more preferably 80% by mass to 100% by mass.

A content of the water-soluble organic solvent in the treatment liquid is not particularly limited, but is preferably 0.1% by mass to 30% by mass, more preferably 0.5% by mass to 15% by mass, and still more preferably 1% by mass to 10% by mass with respect to the total amount of the treatment liquid.

—Thickener—

The treatment liquid in the present disclosure may contain at least one thickener.

In a case where the treatment liquid in the present disclosure contains a thickener, it is easier to adjust the viscosity of the treatment liquid.

Examples of the thickener include a water-soluble resin and polysaccharides (Arabic gum, Guar gum, and the like). Among these, a water-soluble resin is preferable.

The definition of “water-soluble” in the water-soluble resin will be described later.

Examples of the water-soluble resin include polyvinyl alcohol, polyacrylamide, polyvinylpyrrolidone, and polyethylene glycol. Examples of the water-soluble resin also include specific polymer compounds described in JP2016-193980A, and water-soluble polymer compounds described in paragraphs 0026 to 0080 of JP2013-001854A.

A number-average molecular weight of the thickener is preferably 5,000 to 300,000, more preferably 5,000 to 200,000, even more preferably 10,000 to 100,000, and still more preferably 10,000 to 50,000.

In a case where the treatment liquid in the present disclosure contains the water-soluble organic solvent and the thickener, a ratio of the total content of the water-soluble organic solvent and the thickener to the content mass of the aggregating agent (that is, a content mass ratio [(water-soluble organic solvent+thickener)/aggregating agent]) is preferably 0.5 to 2.5, and more preferably 0.5 to 1.5.

In a case where the treatment liquid in the present disclosure contains a thickener, a content of the thickener is preferably more than 0% by mass and 18% by mass or less, more preferably 0.1% by mass to 17% by mass, and still more preferably 0.3% by mass to 15% by mass with respect to the total amount of the treatment liquid.

—Other Components—

The treatment liquid in the present disclosure may contain components other than the above components.

Examples of other components include a resin, a defoamer, and a nitrogen-containing heterocyclic compound.

—Physical Properties of Treatment Liquid—

A surface tension of the treatment liquid is not particularly limited and may be, for example, 20 mN/m or more. From the viewpoint of coatability to the permeable substrate, the surface tension is preferably 20 mN/m to 60 mN/m and more preferably 25 mN/m to 45 mN/m.

The surface tension of the treatment liquid is a value measured by a plate method using an Automatic Surface Tensiometer CBVP-Z (manufactured by Kyowa Interface Science Co., Ltd.) under a condition of 25° C.

From the viewpoint of the aggregation rate of the ink, a pH of the treatment liquid (25° C.±1C) is in a range of preferably 7.0 or less, more preferably 1.0 to 7.0, still more preferably 2.0 to 6.5, and even more preferably 3.0 to 6.0.

The pH is a value measured by using a pH meter (for example, WM-50EG manufactured by DKK-TOA CORPO- RATION) in a state in which a temperature of a treatment liquid is adjusted to 25° C. in an environment of 25° C.

Ink Applying Step

The image recording method according to the embodiment of the present disclosure includes an ink applying step.

The ink applying step is a step of applying an ink containing water, a water-soluble organic solvent, a colorant, and a resin to a region of the permeable substrate, which has been coated with the treatment liquid, by an ink jet method to record an image.

A preferable aspect of the ink will be described later.

The way of jetting the ink in the ink jet method is not particularly limited, and for example, any known methods such as an electric charge control method of jetting the ink using electrostatic attraction force, a drop-on-demand method (pressure pulse method) using vibration pressure of a piezoelectric element, an acoustic ink jet method of converting an electric signal into an acoustic beam, irradiating the ink with the acoustic beam, and jetting the ink by using radiation pressure, a thermal ink jet method (BUBBLE JET (registered trademark)) of heating the ink, forming bubbles, and using generated pressure, and the like may be used.

As the ink jet method, particularly, an ink jet method as a method described in JP1979-59936A (JP-S54-59936A), in which an ink subjected to an action of thermal energy undergoes a sudden volume change, and the ink is jetted from a nozzle by the action force due to this state change, can be effectively used.

As the ink jet method, a method described in paragraphs 0093 to 0105 of JP2003-306623A can also be applied.

The way of using the ink jet head also includes a shuttle method of performing recording while a short serial head is allowed to scan in the width direction of the permeable substrate, and a line method of using a line head in which recording elements are arranged correspondingly to the entire range of one side of the permeable substrate.

By the line method, an image can be recorded on the entire surface of the permeable substrate by scanning the permeable substrate in a direction orthogonal to a direction in which the recording elements are arranged. In the line method, a transport system such as a carriage that allows the short head to perform scanning in the shuttle method is unnecessary. In addition, in the line method, as compared with the shuttle method, a carriage is not required to move, and a complicated scanning control with the permeable substrate is unnecessary, and only the permeable substrate moves. Therefore, according to the line method, an increase in the recording speed of an image is achieved as compared with the shuttle method.

The ink is preferably applied using an ink jet head having a resolution of 300 dpi or more (more preferably 600 dpi or more and still more preferably 800 dpi or more). Herein, dpi is an abbreviation for dot per inch, and 1 inch is 2.54 cm.

From the viewpoint of obtaining a high-definition image, the amount of liquid droplets of the ink jetted from nozzles of the ink jet head is preferably 1 picoliter (pL) to 10 pL and more preferably 1.5 pL to 6 pL.

In addition, from the viewpoint of suppressing unevenness of an image and improving a connection between continuous gradations, it is also effective to jet the ink by combining the different amounts of liquid droplets.

In the ink applying step, the ink applied onto the permeable substrate may be heated and dried.

Examples of a unit for heating and drying the ink include known heating units such as a heater, known blowing units such as a dryer, and units combining these.

Examples of the method for heating and drying the ink include

- a method applying heat using a heater or the like to a surface of the permeable substrate opposite to a surface to which the ink is applied;
- a method of blowing warm air or hot air to the surface of the permeable substrate to which the ink is applied;
- a method of applying heat using an infrared heater to the surface of the permeable substrate to which the ink is applied or to a surface of the permeable substrate opposite to the surface to which the ink is applied; and
- a method of combining a plurality of these methods.

The heating temperature during the heating and drying of the ink is preferably 35° C. or higher, more preferably 40° C. or higher, and still more preferably 50° C. or higher.

The upper limit of the heating temperature is not particularly limited, but for example, the upper limit can be 150° C., preferably 140° C. and more preferably 130° C.

The time for heating and drying the ink is not particularly limited, but is preferably 0.5 seconds to 60 seconds and more preferably 0.5 seconds to 20 seconds.

Applied Mass Ratio [Treatment Liquid/Ink]

In the image recording method according to the embodiment of the present disclosure, from the viewpoint of further suppressing the density unevenness of the image, an applied mass ratio [treatment liquid/ink](that is, a ratio of the applied mass of the treatment liquid to the applied mass of the ink in the region on which the image is recorded) is preferably 0.01 to 0.80, more preferably 0.05 to 0.50, and even more preferably 0.08 to 0.50.

Ink

The ink in the present disclosure contains water, a water-soluble organic solvent, a colorant, and a resin.

Water

The ink in the present disclosure contains water.

A content of the water is not particularly limited, but is preferably 10% by mass or more, more preferably 30% by mass or more, and still more preferably 50% by mass or more with respect to the total amount of the ink.

The upper limit of the content of the water depends on contents of other components, but is, for example, 99% by mass, 90% by mass, 80% by mass, or the like.

Water-Soluble Organic Solvent

The ink in the present disclosure contains at least one water-soluble organic solvent.

Accordingly, jettability from an ink jet head (hereinafter, also simply referred to as "jettability") is ensured.

In the present disclosure, the "water-soluble" in the water-soluble organic solvent means a property of being dissolved 5 g or more in 100 g of water at 20° C.

Examples of the water-soluble organic solvent include alkanediols (polyhydric alcohol) such as glycerin, 1,2,6-hexanetriol, trimethylolpropane, ethylene glycol, and propylene glycol; sugar alcohols; an alkyl alcohol having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol monon-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether; and amide compounds such as formamide, N,N-dimethylformamide, N,N-dimethylacetamide, 2-pyrrolidone, and N-methylpyrrolidone.

The water-soluble organic solvent can be used alone, or two or more thereof may be used in combination.

The water-soluble organic solvent preferably includes a first organic solvent having a boiling point of 110° C. to 240° C. By including the first organic solvent in the water-soluble organic solvent, a content of the high boiling point solvent (for example, a second organic solvent having a boiling point of 245° C. to 300° C.) can be relatively reduced. As a result, drying properties can be improved, and the stickiness of an image can be suppressed.

Examples of the first organic solvent having a boiling point of 110° C. to 240° C. include ethylene glycol (198° C.), propylene glycol (188° C.), dipropylene glycol (230° C.), ethylene glycol monomethyl ether (124° C.), ethylene glycol diethyl ether (162° C.), propylene glycol monoethyl ether (120° C.), dipropylene glycol dimethyl ether (171° C.), diethylene glycol monomethyl ether (194° C.), diethylene glycol diethyl ether (188° C.), and N-methylpyrrolidone (202° C.).

Examples of the second organic solvent having a boiling point of 245° C. to 300° C. include diethylene glycol (245° C.), glycerin (290° C.), 2-pyrrolidone (245° C.), and triethylene glycol monomethyl ether (248° C.).

As the first organic solvent and the second organic solvent, from the viewpoint of head maintainability, an alcohol-based organic solvent or an ether-based organic solvent is preferable. As compared with an amide-based organic solvent (for example, 2-pyrrolidone and the like) which easily interacts with the polymer component, since the alcohol-based organic solvent and the ether-based organic solvent are less likely to adhere to the inside of the ink jet head, the maintainability of the ink jet head is improved.

Specific examples of the alcohol-based organic solvent include ethylene glycol, propylene glycol, diethylene glycol, dipropylene glycol, and glycerin.

Examples of the ether-based organic solvent include alkyl ethers of ethylene glycol, propylene glycol, diethylene glycol, dipropylene glycol, and glycerin described above.

Specific examples of the ether-based organic solvent include alkyl ethers such as ethylene glycol monomethyl ether, ethylene glycol diethyl ether, propylene glycol monoethyl ether, dipropylene glycol dimethyl ether, diethylene glycol monomethyl ether, and diethylene glycol diethyl ether.

In the present disclosure, each of the first organic solvent and the second organic solvent is preferably at least one alcohol-based organic solvent selected from the group consisting of ethylene glycol, diethylene glycol, propylene glycol, triethylene glycol, dipropylene glycol, glycerin, and an alkyl ether thereof.

In a case where the water-soluble organic solvent includes the first organic solvent, a mass ratio ($S^2/S^1$) of a content of the second organic solvent ($S^2$) to a content of the first organic solvent ($S^1$) is preferably in a range of 0 to 0.3. In a case where $S^2/S^1$ is within the above-described range, the amount of the organic solvent having a high boiling point is suppressed to a low level, so that the stickiness of an image after drying is suppressed.

$S^2/S^1$ is more preferably in a range of 0 to 0.2 for the same reason as described above.

The ink in the present disclosure may contain an organic solvent other than the above-described water-soluble organic solvent as long as the effects in the present disclosure are not significantly impaired.

The total amount of the first organic solvent and the second organic solvent in the ink is preferably 5% by mass to 30% by mass with respect to the total amount of the ink.

In a case where the total amount of the first organic solvent and the second organic solvent is within the above-described range, the amount of the organic solvent is suppressed to a low level, so that the stickiness of an image after drying is suppressed. In addition, in a case where the total amount of the first organic solvent and the second organic solvent is 5% by mass or more, the occurrence of clogging of jetting holes due to the solidification of the ink generated at an air interface in the ink jet head is suppressed, which causes the satisfactory jettability to be obtained.

For the same reason as described above, the total amount of the first organic solvent and the second organic solvent is more preferably in a range of 7.5% by mass to 40% by mass, and still more preferably in a range of 10% by mass to 30% by mass.

Colorant

The ink in the present disclosure contains at least one colorant.

Examples of the colorant include a dye and a pigment, and a pigment is preferable.

The pigment includes an organic pigment and an inorganic pigment.

Examples of the organic pigment include an azo pigment, a polycyclic pigment, a chelate dye, a nitro pigment, a nitroso pigment, and aniline black. Among these, an azo pigment or a polycyclic pigment is preferable.

Examples of the azo pigment include an azo lake, an insoluble azo pigment, a condensed azo pigment, and a chelated azo pigment.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment.

Examples of the chelate dye include a basic dye-type chelate, and an acid dye-type chelate.

Examples of the inorganic pigment include titanium oxide, iron oxide, calcium carbonate, barium sulfate, aluminum hydroxide, Barium Yellow, Cadmium Red, Chrome Yellow, and carbon black.

Specific examples of the pigment include pigments described in paragraphs 0142 to 0145 of JP2007-100071A.

A volume-average particle diameter of the pigment is preferably 10 nm to 200 nm, more preferably 10 nm to 150 nm, and still more preferably 10 nm to 100 nm. In a case where the volume-average particle diameter is 200 nm or less, satisfactory color reproducibility is obtained, and in a case where an image is recorded by an ink jet method, satisfactory jetting properties are obtained. In a case where the volume-average particle diameter is 10 nm or more, satisfactory light resistance is obtained.

There are no particular limitations on the particle size distribution of the pigment in the ink, and the particle size distribution may be any one of a wide particle size distribution or a monodisperse particle size distribution. In addition, two or more pigments each having a monodisperse particle size distribution may be used as a mixture.

The volume-average particle diameter and the particle size distribution of the pigment in the ink are values measured by a particle size distribution measuring device using light scattering (for example, Microtrac UPA (registered trademark) EX150 manufactured by Nikkiso Co., Ltd.).

A content of the pigment in the ink is not particularly limited and may be appropriately selected according to the purpose, application, and the like. From the viewpoint of colorability and storage stability, the content of the pigment in the ink is preferably 1% by mass to 20% by mass, and more preferably 1% by mass to 10% by mass with respect to the total amount of the ink.

Resin

The ink in the present disclosure contains a resin.

The resin contained in the ink is preferably at least one selected from the group consisting of a pigment dispersion resin for dispersing the pigment, a water-soluble resin, and resin particles.

For each of the pigment dispersion resin, the water-soluble resin, and the resin particles, description in WO2022/097503A can be appropriately referred to.

A content of the resin in the ink is preferably 1% by mass to 20% by mass, more preferably 1% by mass to 15% by mass, and still more preferably 1% by mass to 10% by mass with respect to the total amount of the ink.

—Pigment Dispersion Resin—

The pigment dispersion resin covers a part or all of the surface of the pigment and functions as a dispersing agent for dispersing the pigment.

The pigment dispersion resin preferably contains at least one anionic group. As a result, dispersibility of the hydrophobic pigment can be further enhanced in the ink containing water and the water-soluble organic solvent.

Examples of the anionic group which can be contained in the pigment dispersion resin include an acid group (for example, a carboxy group, a sulfo group, a phosphoric acid group, and the like) and a salt of the acid group (for example, a salt of the carboxy group, a salt of the sulfo group, and a salt of the phosphoric acid group).

The anionic group which can be contained in the pigment dispersion resin may be used alone or in combination of two or more kinds thereof.

A preferred aspect of the anionic group which can be contained in the pigment dispersion resin is the same as a preferred aspect of the anionic group which can be contained in the water-soluble resin X1, which will be described later.

The anionic group in the pigment dispersion resin may be introduced into the structure of the pigment dispersion resin by polymerizing a polymerizable monomer containing an anionic group.

That is, the pigment dispersion resin may contain a structural unit derived from a polymerizable monomer containing an anionic group.

Specific examples of the constitutional unit derived from a polymerizable monomer containing an anionic group are shown below.

However, the constitutional unit derived from a polymerizable monomer containing an anionic group is not limited thereto.

Examples of the constitutional unit derived from a polymerizable monomer containing an anionic group also include structural units in which the acid group (for example, —COOH) in the structural unit of each specific example below is neutralized to form a salt of the acid group (for example, —COONa).

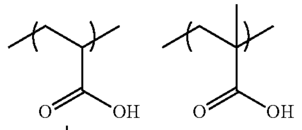

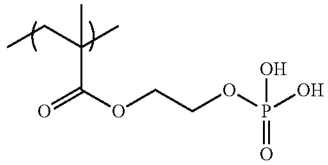

P-1M

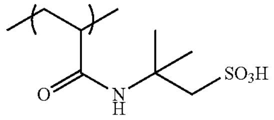

AMPS

In addition, in the pigment dispersion resin covering a part or all of the surface of the pigment, a plurality of "constitutional units derived from a polymerizable monomer containing an anionic group" may be crosslinked with a crosslinking agent.

The pigment dispersion resin of such an aspect can be formed by, for example, dispersing the pigment with an uncrosslinked pigment dispersion resin containing the constitutional unit derived from a polymerizable monomer containing an anionic group, and then crosslinking the uncrosslinked pigment dispersion resin covering at least part of the pigment with a crosslinking agent (for example, see JP4964165B).

In a case where the pigment dispersion resin contains a structural unit derived from a polymerizable monomer containing an anionic group, from the viewpoint of pigment dispersibility, a content of the structural unit derived from a polymerizable monomer containing an anionic group is preferably 5% by mass to 40% by mass, and more preferably 8% by mass to 20% by mass with respect to the total amount of the pigment dispersion resin.

The pigment dispersion resin preferably contains an aromatic ring.

In a case where the pigment dispersion resin contains an aromatic ring, the pigment dispersion resin tends to be more hydrophobic. As a result, the pigment dispersion resin easily covers a part or all of the surface of the pigment, and stability of the pigment in water is further enhanced.

In the present disclosure the aromatic ring means a cyclic unsaturated ring having aromaticity.

Examples of the aromatic ring which can be included in the pigment dispersion resin include aromatic hydrocarbon rings such as a benzene ring, a naphthalene ring, an anthracene ring, and a pyrene ring; and heteroaromatic rings such as a pyridine ring, a pyrrole ring, a furan ring, a thiophene ring, an imidazolyl ring, and an acridone ring; and the like.

Among these, an aromatic hydrocarbon ring is preferable.

The aromatic ring in the pigment dispersion resin may be introduced into the structure of the pigment dispersion resin by polymerizing a polymerizable monomer containing an aromatic ring. In other words, the pigment dispersion resin may contain a structural unit derived from a polymerizable monomer containing an aromatic ring.

As the polymerizable monomer containing an aromatic ring, a polymerizable monomer containing an aromatic ring and an ethylenically unsaturated double bond is preferable, and a vinyl polymerizable monomer containing an aromatic ring is more preferable.

Examples of the polymerizable monomer containing an aromatic ring include styrene, methylstyrene, divinylbenzene, vinylpyridine, diallyl phthalate, and the like, and (meth)acrylates containing an aromatic ring (for example, benzyl acrylate, phenoxyethyl acrylate, and the like).

The polymerizable monomer containing an aromatic ring may be unsubstituted, or may be a substituted polymerizable monomer substituted with a substituent. Examples of the substituent include a halogen atom, an alkyl group, a carboxylic acid group, a hydroxyl group, and the like.

Examples of the halogen atom include a chlorine atom, a bromine atom, and an iodine atom.

As the alkyl group, an alkyl group having 1 to 12 carbon atoms (preferably 1 to 8 carbon atoms) is preferable, and examples thereof include a methyl group, an ethyl group, a propyl group, a butyl group, a hexyl group, and the like. The alkyl group may be unsubstituted or may have a substituent same as the substituents described above.

Specific examples of the structural unit derived from a polymerizable monomer containing an aromatic ring are shown below. The present disclosure is not limited to the following specific examples. "*" in each structure indicates a bonding site. In addition, "iBu" represents isobutyl, "nBu" represents normal butyl, and "tBu" represents tertiary butyl.

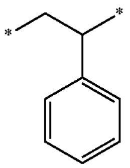
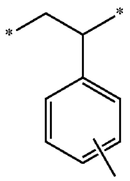
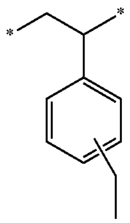
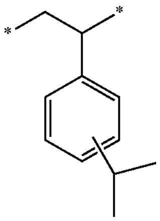
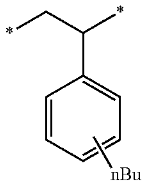
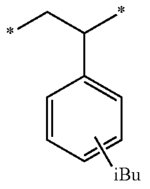
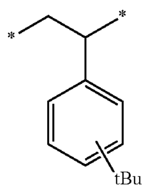
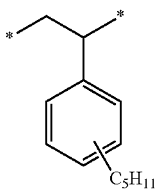
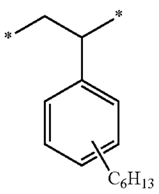
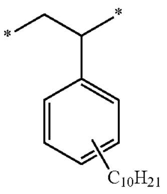
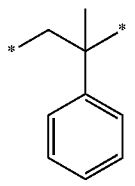
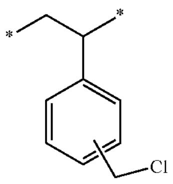

-continued

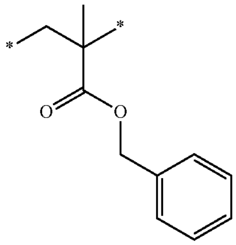
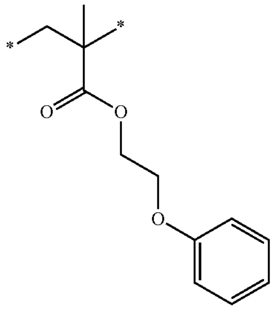
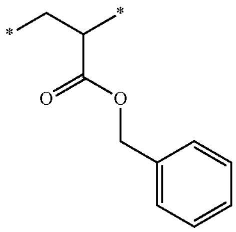
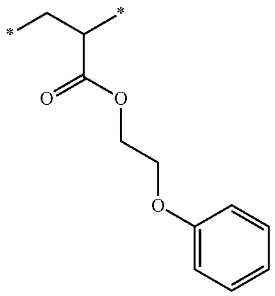
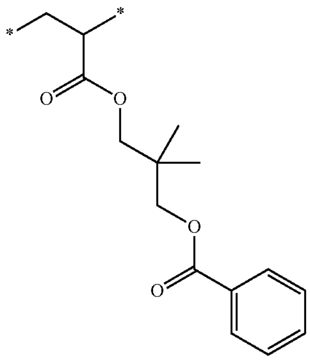
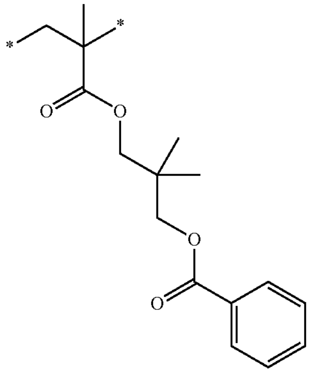 [SMILES: *CC(*)(C)C(=O)OCC(C)(C)COC(=O)c1ccccc1]

A content of the structural unit derived from a polymerizable monomer containing an aromatic ring is preferably 50% by mass to 85% by mass, and more preferably 60% by mass to 80% by mass with respect to the total amount of the pigment dispersion resin.

The pigment dispersion resin can contain a constitutional unit derived from a polymerizable monomer containing no aromatic ring, in addition to the constitutional unit derived from a polymerizable monomer containing an aromatic ring.

Suitable examples of the constitutional unit derived from a polymerizable monomer containing no aromatic ring can include alkyl (meth)acrylate.

As the alkyl (meth)acrylate, alkyl (meth)acrylate with an alkyl moiety having 1 to 20 carbon atoms is preferable.

Examples of the alkyl (meth)acrylate include methyl (meth) acrylate, ethyl (meth)acrylate, butyl (meth)acrylate, stearyl (meth)acrylate, and the like.

Specific examples of the pigment dispersion resin include the following copolymers. A mass ratio of monomers in each copolymer can be appropriately selected within a range satisfying a range of a weight-average molecular weight. The present disclosure is not limited to the following specific examples.

Benzyl methacrylate/acrylic acid copolymer
Benzyl methacrylate/methacrylic acid copolymer
Styrene/acrylic acid/stearyl acrylate copolymer
Styrene/acrylic acid/stearyl methacrylate copolymer
Benzyl methacrylate/methacrylic acid/stearyl methacrylate copolymer
Phenoxyethyl methacrylate/methacrylic acid/stearyl methacrylate copolymer
Phenoxyethyl methacrylate/methacrylic acid/stearyl methacrylate/hydroxyethyl methacrylate copolymer From the viewpoint of the dispersibility and dispersion stability of the pigment, an acid value of the pigment dispersion resin is preferably 50 mgKOH/g to 180 mgKOH/g, more preferably 50 mgKOH/g to 150 mgKOH/g, and still more preferably 50 mgKOH/g to 120 mgKOH/g.

The acid value can be measured by titration of an indicator, and is a value measured by a method described in Japanese Industrial Standards (JIS) K0070: 1992.

A weight-average molecular weight (Mw) of the pigment dispersion resin is preferably 1,000 to 100,000, and more preferably 10,000 to 50,000.

From the viewpoint of obtaining satisfactory dispersibility of the pigment, a content of the pigment dispersion resin in the ink is preferably 10% by mass to 80% by mass and more preferably 25% by mass to 70% by mass with respect to the amount of the pigment.

—Water-Soluble Resin—

The water-soluble resin is a resin having water solubility.

In the present disclosure, the "water-soluble" in the water-soluble resin means a property that the amount dissolved in 100 g of water at 25° C. is 1 g or more. The "water-soluble" in the water-soluble resin is preferably a property that the amount dissolved in 100 g of water at 25° C. is 3 g or more (more preferably 10 g or more).

The water-soluble resin preferably contains a water-soluble resin X1 containing an alkyl group having 1 to 3 carbon atoms, an anionic group, and a cyclic structure.

—Alkyl Group having 1 to 3 Carbon Atoms—

The alkyl group having 1 to 3 carbon atoms in the water-soluble resin X1 is a methyl group, an ethyl group, or a propyl group (that is, an n-propyl group or an i-propyl group), and a methyl group or an ethyl group is preferable and a methyl group is more preferable.

The water-soluble resin X1 may contain only one kind of the alkyl group having 1 to 3 carbon atoms, or may contain two or more kinds thereof.

The alkyl group having 1 to 3 carbon atoms in the water-soluble resin X1 may be introduced into the structure of the water-soluble resin X1 by polymerizing a polymerizable monomer containing an alkyl group having 1 to 3 carbon atoms.

That is, the water-soluble resin X1 may contain a structural unit derived from a polymerizable monomer containing an alkyl group having 1 to 3 carbon atoms.

As the polymerizable monomer containing an alkyl group having 1 to 3 carbon atoms, from the viewpoint of further improving the laminate suitability of the image, a (meth) acrylic acid alkyl ester in which an alkyl group in an alkyl ester structure has 1 to 3 carbon atoms [hereinafter, also referred to as "(meth)acrylic acid C1-3 alkyl ester" ] is preferable.

Specifically, the (meth)acrylic acid C1-3 alkyl ester is methyl (meth)acrylate, ethyl (meth)acrylate, n-propyl (meth)acrylate, or i-propyl (meth)acrylate.

As the (meth)acrylic acid C1-3 alkyl ester, methyl (meth) acrylate or ethyl (meth)acrylate is preferable, and methyl (meth)acrylate is more preferable.

In addition, as the (meth)acrylic acid C1-3 alkyl ester, a methacrylic acid C1-3 alkyl ester is preferable.

In a case where the water-soluble resin X1 contains a (meth)acrylic acid C1-3 alkyl ester unit, the water-soluble resin X1 may contain one kind of the (meth)acrylic acid C1-3 alkyl ester unit, or two or more kinds thereof.

A content of the (meth)acrylic acid C1-3 alkyl ester unit in the water-soluble resin X1 is preferably 3% by mass to 80% by mass, more preferably 3% by mass to 50% by mass, and still more preferably 5% by mass to 50% by mass with respect to the total amount of the water-soluble resin X1.

—Anionic Group—

Examples of the anionic group in the water-soluble resin X1 include an acid group (for example, a carboxy group, a sulfo group, a phosphoric acid group, and the like) and a salt of the acid group (for example, a salt of the carboxy group, a salt of the sulfo group, and a salt of the phosphoric acid group).

The anionic group contained in the water-soluble resin X1 may be used alone or in combination of two or more kinds thereof.

The water-soluble resin X1 may contain both the acid group and the salt of the acid group as the anionic group.

The salt of the acid group (for example, the salt of the carboxy group, the salt of the sulfo group, and the salt of the phosphoric acid group) can be formed by neutralizing the acid group (for example, the carboxy group, the sulfo group, and the phosphoric acid group) with a neutralizing agent.

The acid group may be neutralized before the polymerization of the polymerizable monomer containing an acid group, or after the polymerizable monomer is polymerized.

Examples of the neutralizing agent for neutralizing the acid group include inorganic bases such as an alkali metal hydroxide and an alkaline earth metal hydroxide, and organic bases such as an organic amine.

Examples of the alkali metal include potassium (K) and sodium (Na).

Examples of the alkaline earth metal include calcium (Ca) and magnesium (Mg).

Examples of the alkali metal hydroxides include potassium hydroxide, sodium hydroxide, and the like.

Examples of the alkaline earth metal hydroxides include calcium hydroxide and magnesium hydroxide.

Examples of the organic amines include ammonia, a primary amine (for example, ethylamine, monoethanolamine, and the like), a secondary amine (for example, diethylamine, ethylenediamine, and the like), and a tertiary amine (for example, triethylamine, triethanolamine, isopropylethylamine, pyrrolidine, piperidine, and the like), and a quaternary ammonium salt. Among these, as the organic amine, an organic amine having a boiling point of 80° C. or higher is preferable from the viewpoint of storage stability.

From the viewpoint of the storage stability, the neutralizing agent is preferably an alkali metal hydroxide or an organic amine, and more preferably an alkali metal hydroxide or an organic amine having a boiling point of 80° C. or higher.

Examples of the organic amine having a boiling point of 80° C. or higher include ethylenediamine (117° C.), triethylamine (90° C.), monoethanolamine (170° C.), triethanolamine (208° C.), isopropylethylamine (127° C.), and pyrrolidine (87° C.), piperidine (106° C.), and the like.

From the viewpoint of exhibiting the thickening action of the ink well and further suppressing the streaks in the image, the water-soluble resin X1 preferably contains, as the anionic group, at least one of a carboxy group or a salt of the carboxy group.

In this case, a proportion (% by mole; hereinafter, also referred to as a degree of neutralization) of the salt of the carboxy group to the total of the carboxy group and the salt of the carboxy group is preferably 40% by mole or more, more preferably 50% by mole or more, still more preferably 60% by mole or more, and even more preferably 80% by mole or more.

In addition, the upper limit of the degree of neutralization can be 100% by mole.

The anionic group which can be contained in the water-soluble resin X1 may be introduced into the structure of the water-soluble resin X1 by polymerizing a polymerizable monomer containing an anionic group (and, as necessary, neutralizing the polymerizable monomer with a neutralizing agent).

That is, the water-soluble resin X1 may contain a structural unit derived from a polymerizable monomer containing an anionic group.

As the polymerizable monomer containing an anionic group, (meth)acrylic acid is particularly preferable.

In a case where the water-soluble resin X1 contains a structural unit derived from a polymerizable monomer containing anionic group (for example, (meth)acrylic acid), a content of the structural unit derived from a polymerizable monomer containing anionic group is preferably 5% by mass to 40% by mass, and more preferably 8% by mass to 20% by mass with respect to the total amount of the water-soluble resin X1.

From the viewpoint of further improving the laminate suitability, the cyclic structure in the water-soluble resin X1 preferably contains at least one of an aromatic ring or an aliphatic ring, and more preferably contains an aromatic ring.

The water-soluble resin X1 may contain only one kind of the cyclic structure, or may contain two or more kinds thereof.

In the present disclosure the aromatic ring means a cyclic unsaturated ring having aromaticity.

Examples of the aromatic ring include:

aromatic hydrocarbon rings such as a benzene ring, a naphthalene ring, an anthracene ring, and a pyrene ring; and heteroaromatic rings such as a pyridine ring, a pyrrole ring, a furan ring, a thiophene ring, an imidazolyl ring, and an acrydone ring.

Among these, an aromatic hydrocarbon ring is preferable.

In a case where the cyclic structure in the water-soluble resin X1 contains an aromatic ring, the aromatic ring can be introduced into the structure of the water-soluble resin X1 by polymerizing a polymerizable monomer containing an aromatic ring.

As the polymerizable monomer containing an aromatic ring, a polymerizable monomer containing an aromatic ring and an ethylenically unsaturated double bond is preferable, and a vinyl polymerizable monomer containing an aromatic ring is more preferable.

Examples of the polymerizable monomer containing an aromatic ring include styrene, methylstyrene, divinylbenzene, vinylpyridine, diallyl phthalate, and the like, and (meth)acrylates containing an aromatic ring (for example, benzyl acrylate, phenoxyethyl acrylate, and the like).

The polymerizable monomer containing an aromatic ring may be unsubstituted, or may be a substituted polymerizable monomer substituted with a substituent. Examples of the substituent include a halogen atom, an alkyl group, a carboxylic acid group, a hydroxyl group, and the like.

Examples of the halogen atom include a chlorine atom, a bromine atom, and an iodine atom.

As the alkyl group, an alkyl group having 1 to 12 carbon atoms (preferably 1 to 8 carbon atoms) is preferable, and examples thereof include a methyl group, an ethyl group, a propyl group, a butyl group, a hexyl group, and the like. The alkyl group may be unsubstituted or may have a substituent same as the substituents described above.

Specific examples of the structural unit derived from a polymerizable monomer containing an aromatic ring, which can be contained in the water-soluble resin X1, are the same as the specific examples of the structural unit derived from a polymerizable monomer containing an aromatic ring, which can be contained in the pigment dispersion resin described above.

A content of the structural unit derived from a polymerizable monomer containing a cyclic structure (for example, an aromatic ring) in the water-soluble resin X1 is preferably 50% by mass to 85% by mass, and more preferably 60% by mass to 80% by mass with respect to the total amount of the water-soluble resin X1.

From the viewpoint of further improving the laminate suitability of the image, it is particularly preferable that the water-soluble resin X1 contains a structural unit derived from the (meth)acrylic acid C1-3 alkyl ester [that is, the (meth)acrylic acid alkyl ester in which the alkyl group in the alkyl ester structure has 1 to 3 carbon atoms], a structural unit derived from (meth)acrylic acid, and a structural unit derived from the polymerizable monomer containing a cyclic structure.

A preferred content of each structural unit in this aspect is as described above.

In the above-described aspect, the concept of "structural unit derived from (meth)acrylic acid" includes both the structural unit obtained by polymerizing (meth)acrylic acid (that is, structural unit containing a carboxy group) and the structural unit obtained by polymerizing and neutralizing (meth)acrylic acid (that is, structural unit containing a salt of the carboxy group) (here, the neutralization may be performed before or after polymerization).

A weight-average molecular weight of the water-soluble resin X1 is preferably 5,000 to 100,000. In a case where the weight-average molecular weight of the water-soluble resin X1 is within the above-described range, blurring and blocking of an image are further suppressed. In addition, the jettability of the ink is more excellent.

The weight-average molecular weight of the water-soluble resin X1 is more preferably 10,000 to 80,000 in terms of the jettability of the ink, and still more preferably 10,000 to 30,000.

An acid value of the water-soluble resin X1 is preferably 28 mgKOH/g to 230 mgKOH/g. In a case where the acid value is 230 mgKOH/g or less, the thickening effect of the ink can be easily obtained even in a case where a small amount of the water-soluble polymer is used, and the blurring in an image is suppressed. From the viewpoint of the thickening effect of the ink, the acid value is more preferably 50 mgKOH/g or more, and furthermore, may be 100 mgKOH/g or more or 150 mgKOH/g or more.

The acid value can be measured by titration of an indicator in the same manner as that of the pigment dispersion resin, and is a value measured by a method described in Japanese Industrial Standards (JIS) K0070: 1992.

In the present disclosure, in a case where the resin component (X) (for example, the water-soluble resin X1) is a neutralized resin, the acid value of the resin component (X) (for example, the water-soluble resin X1) means an acid value of the resin component (X) (for example, the water-soluble resin X1) as the neutralized resin.

A glass transition temperature (Tg) of the water-soluble resin X1 is preferably 80° C. or higher. In a case where Tg is 80° C. or higher, image blocking is further suppressed.

The Tg of the water-soluble resin X1 is more preferably 95° C. or higher and still more preferably 110° C. or higher. In addition, the upper limit of Tg of the water-soluble resin X1 is preferably 250° C. or lower in terms of synthesis suitability.

A sample obtained by drying a solution of the water-soluble resin X1 at 150° C. under reduced pressure for 6 hours is prepared and measured at a heating rate of 10° C./min by using a differential scanning calorimeter (DSC) to obtain Tg. As the DSC, for example, a differential scanning calorimeter (DSC) DSC7000X manufactured by Hitachi High-Tech Science Corporation can be used.

—Resin Particles—

The resin particles are particles including a resin, and are preferably particles including a water-insoluble resin.

The "water-insoluble" in the water-insoluble resin means a property that the amount dissolved in 100 g of water at 25° C. is less than 1 g.

The resin particles are distinguished from the pigment dispersion resin in terms that the resin particles are particles including a resin.

As the resin particles, particles including an acrylic resin (hereinafter, also referred to as acrylic resin particles), particles including a polyester resin (hereinafter, also referred to as polyester resin particles), particles including a polyurethane resin (hereinafter, also referred to as polyurethane resin particles), or particles including a polyolefin resin (hereinafter, also referred to as polyolefin resin particles) are preferable.

In the present disclosure, the polyester resin means a polymer compound having an ester bond in the main chain. Examples of the polyester resin include a polycondensate of polyvalent carboxylic acid (such as dicarboxylic acid) and polyalcohol (such as a diol).

In the present disclosure, the polyolefin resin means a polymer (a homopolymer or a copolymer) of a raw material monomer containing an olefin. Examples of the polyolefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

In the present disclosure, the polyurethane resin means a polymer compound having a urethane bond.

The resin particles preferably contain acrylic resin particles.

A ratio of the acrylic resin particles in the resin particles is preferably 60% by mass or more, more preferably 80% by mass or more, and still more preferably 90% by mass or more.

Examples of the resin particles include known resin particles described in paragraphs 0062 to 0076 of JP2016-188345A and paragraphs 0109 to 0140 of WO2013/180074A.

Preferred ranges of the weight-average molecular weight, acid value, and glass transition temperature of the resin constituting the resin particles are the same as the preferred ranges of the weight-average molecular weight, acid value, and glass transition temperature of the water-soluble resin X1, respectively.

Other Components

The ink in the present disclosure may further contain other components in addition to the above-described components, as necessary.

Examples of other components include anti-drying agents (swelling agents), anti-coloring agents, penetration enhancers, ultraviolet absorbers, preservatives, rust inhibitors, antifoaming agents, viscosity adjusters, pH adjusters, and chelating agents.

Physical Properties of Ink

A surface tension of the ink is not particularly limited and may be, for example, 20 mN/m or more. From the viewpoint of coatability on the recording medium, the surface tension is preferably 25 mN/m to 40 mN/m and more preferably 27 mN/m to 37 mN/m.

The surface tension of the ink is a value measured by a plate method using an Automatic Surface Tensiometer CBVP-Z (manufactured by Kyowa Interface Science Co., Ltd.) under a condition of 25° C.

A pH (25° C.±1° C.) of the ink is preferably 6 to 10 and more preferably 7 to 10.

The pH is a value measured by using a pH meter (for example, WM-50EG manufactured by DKK-TOA CORPORATION) in a state in which a temperature of a treatment liquid is adjusted to 25° C. in an environment of 25° C.

From the viewpoint of the jettability of the ink, and the like, a viscosity of the ink is preferably in a range of 1 mPa·s to 30 mPa s, more preferably in a range of 1 mPa·s to 20 mPa s, still more preferably in a range of 2 mPa·s to 15 mPa s, and particularly preferably in a range of 2 mPa·s to 10 mPa s.

The viscosity means a value measured under the condition of 25° C. The viscosity can be measured by using, for example, VISCOMETER TV-22 (manufactured by TOKI SANGYO CO. LTD.).

EXAMPLES

Hereinafter, examples of the present disclosure will be shown, but the present disclosure is not limited to the following examples.

In the following, unless otherwise specified, "parts" and "%" are based on mass.

In the following, "water" means ion exchange water unless otherwise specified.

A viscosity of the treatment liquid is a viscosity at 25° C.

Preparation of Resin

As a resin which is a component in the ink, the following water-soluble resin and resin particles were prepared.

Preparation of Water-Soluble Resin Solution

A 500 mL three-neck flask equipped with a stirrer, a thermometer, a reflux condenser, and a nitrogen gas introduction pipe was charged with propylene glycol (82 g) and heated to 90° C. under a nitrogen stream. A mixed solution obtained by mixing 1.57 g of PERBUTYL O (radical polymerization initiator; manufactured by NOF Corporation), 15 g of 2-methacryloyloxyethyl acid phosphate (P-1M), 45 g of methyl methacrylate (MMA), 30 g of isobornyl methacrylate (IBOMA), 10 g of acryloyl morpholine (ACMO), 1.84 g of dodecyl mercaptan, and 152 g of propylene glycol was added dropwise thereto at a constant rate under a dropwise addition condition in which the dropwise addition was completed in 3 hours. After completion of the dropwise addition of the mixed solution, a mixture was stirred for 4 hours. Subsequently, 12 g of a 24% by mass sodium hydroxide aqueous solution (alkali metal hydroxide) was added dropwise to the obtained reaction mixture using a dropping funnel to obtain a water-soluble resin solution.

A composition of the obtained water-soluble resin solution was confirmed by $^1$H-NMR, and a concentration of solid contents of the water-soluble resin solution was 30.1% by mass.

The water-soluble resin included a phosphoric acid group as an acid group in the molecule, and an acid value was 40 mgKOH/g. The water-soluble resin had a weight-average molecular weight (Mw) of 15,000 and a glass transition temperature (Tg) of 118° C.

Preparation of Resin Particles 360.0 g of methyl ethyl ketone was put into a 2 L three-neck flask provided with a stirrer, a thermometer, a reflux condenser, and a nitrogen gas introduction pipe, and then heated to 75° C. While the temperature inside a reaction container was maintained at 75° C., a mixed solution consisting of 36.0 g of dicyclopentanyl methacrylate (DCPMA), 306.0 g of methyl methacrylate (MMA), 18.0 g of methacrylic acid (MAA), 72 g of methyl ethyl ketone, and 1.44 g of "V-601" (radical polymerization initiator; manufactured by FUJIFILM Wako Pure Chemical Corporation) was added dropwise thereto at a constant rate such that the dropwise addition was completed in 2 hours. After the dropwise addition was completed, a solution consisting of 0.72 g of "V-601" and 36.0 g of methyl ethyl ketone was added thereto and stirred at 75° C. for 2 hours, a solution consisting of 0.72 g of "V-601" and 36.0 g of methyl ethyl ketone was then added thereto and stirred at 75° C. for 2 hours, and the solution was heated to 85° C. and continually stirred for another 2 hours. Next, 668.3 g of the polymerization solution was weighed, 388.3 g of isopropanol and 122.1 ml of a 1 mol/L NaOH aqueous solution were added thereto, and the temperature inside the reaction container was raised to 80° C. Next, 720.1 g of distilled water was added dropwise at a rate of 20 ml/min to disperse the water. Then, a solvent was distilled off by keeping the temperature inside the reaction container at 80° C. for 2 hours, 85° C. for 2 hours, and 90° C. for 2 hours under atmospheric pressure. Thereafter, the pressure inside the reaction container was further reduced, and a total amount of 913.7 g of isopropanol, methyl ethyl ketone, and distilled water was distilled off, thereby obtaining an aqueous dispersion liquid of resin particles having a concentration of solid contents of 28.0% by mass.

The obtained aqueous dispersion liquid of resin particles had a pH of 8.4, a volume-average particle diameter of 80 nm, a weight-average molecular weight (Mw) of 50,000, and a Tg of 116° C.

A pH was measured at 25° C. by adjusting the temperature of the aqueous dispersion liquid of resin particles to 25° C. and using a pH meter WM-50EG (manufactured by DKK-TOA CORPORATION). In addition, the volume-average particle diameter of the resin particles [DCPMA/MMA/MAA] was measured using Microtrac UPA EX-150 (manufactured by Nikkiso Co., Ltd.).

Example 1

Preparation of Cyan Pigment Dispersion

—Preparation of Pigment Dispersion Resin—

44 g of methyl ethyl ketone was added to a 500 ml three-neck flask equipped with a stirrer and a cooling pipe, the mixture was heated to 72° C. under a nitrogen atmosphere, and a solution obtained by dissolving 0.43 g of dimethyl 2,2'-azobisisobutyrate, 35 g of benzyl methacrylate (BzMA), 5 g of methacrylic acid (MAA), and 10 g of methyl methacrylate (MMA) in 25 g of methyl ethyl ketone is added dropwise thereto for 3 hours. After completion of the dropwise addition, a reaction was further carried out for 1 hour, a solution obtained by dissolving 0.21 g of dimethyl 2,2'-azobisisobutyrate in 1 g of methyl ethyl ketone was added, the temperature of the mixture was raised to 78° C., and the mixture was heated for 4 hours. The obtained reaction solution was reprecipitated twice in a large excess amount of hexane, and a precipitated resin was dried to obtain 43 g of a pigment dispersion resin.

The pigment dispersion resin had an acid value of 65.4 mgKOH/g, a C log P of 1.89, and a weight-average molecular weight (Mw) of 42,000.

—Preparation of Cyan Pigment Dispersion 1—

10 parts of Pigment Blue 15:3 (phthalocyanine blue A220, manufactured by Dainichiseika Color&Chemicals Mfg. Co., Ltd.), 5 parts of the above-described pigment dispersion resin, 42 parts of methyl ethyl ketone, and 5.5 parts of a 1 mol/L sodium hydroxide (NaOH) aqueous solution, and 87.2 parts of ion exchange water were mixed. The mixed liquid was dispersed by a beads mill using 0.1 mmφ zirconia beads for 2 to 6 hours. Methyl ethyl ketone was removed from the obtained dispersion at 55° C. under reduced pressure, and a part of water was further removed to obtain a cyan pigment dispersion having a pigment concentration of 10.2% by mass.

Preparation of Ink

By using the above-described cyan pigment dispersion and the solution of the water-soluble resin, a mixed liquid was prepared by mixing various components to have the following composition. After the preparation, coarse particles were removed from the mixed liquid with a 5 μm filter to obtain an ink (specifically cyan ink).

—Ink Composition—

| | |
|---|---|
| Cyan pigment (Pigment Blue 15:3, manufactured by Dainichiseika Color&Chemicals Mfg. Co., Ltd.) | 3% by mass |
| Pigment Dispersion Resin | 2% by mass |
| Water-Soluble Resin | 5% by mass (expressed in terms of solid contents) |
| Propylene glycol (PG; manufactured by FUJIFILM Wako Pure Chemical Corporation) | 20% by mass |
| OLFINE E1010 (manufactured by Nissin Chemical co., ltd., nonionic surfactant) | 1% by mass |
| Water | in an amount of total 100% by mass |

Preparation of Treatment Liquid

Each component in the following composition was mixed to obtain a treatment liquid.

The obtained treatment liquid had a viscosity of 5 mPa-s (25° C.), a surface tension of 41.0 mN/m (25° C.), and pH of 5.0 (25° C.).

Each of the viscosity, surface tension, and pH was measured using a VISCOMETER TV-22 (manufactured by Toki Sangyo Co., Ltd.), an Automatic Surface Tensiometer CBVP-Z (manufactured by Kyowa Interface Science Co. Ltd.), and a pH meter WM-50EG (manufactured by DKK-TOA CORPORATION).

—Composition of Treatment Liquid—

| | |
|---|---|
| DEGmBE (diethylene glycol monobutyl ether) [water-soluble organic solvent] | 2% by mass |
| Calcium formate [aggregating agent] | 5% by mass |
| PEG20000 (polyethylene glycol, number-average molecular weight: 20,000) [thickener] | 1% by mass |
| Water | in an amount of total 100% by mass |

Image Recording

As a permeable substrate, "MAGNO (registered trademark) Gross" which is coated paper manufactured by Sappi was prepared.

The above-described permeable substrate was fixed on a stage, and while transporting the permeable substrate at a stage speed (that is, a coating speed) of 60 m/min, the treatment liquid is applied to the transported permeable substrate with a coating roller having a diameter of 200 mm (a material of the outer peripheral surface was ethylene propylene diene rubber (EPDM)) to be an applying amount of 1.5 $g/m^2$. Immediately after the application (specifically, within 1 second after the application), hot air at 70° C. was applied to the applied treatment liquid using a dryer for 2 seconds to dry the treatment liquid.

Next, a line head (printer head GELJET GX5000 manufactured by Ricoh Co., Ltd.) arranged at an angle with respect to a moving direction of the permeable substrate was used to jet and apply, in a solid image, the ink onto a treatment liquid-applied surface of the permeable substrate under jetting conditions of a resolution of 1200×1200 dots per inch (dpi), a jetting amount of 2.4 picolitre (pL), and a stage speed of 38 m/min, thereby obtaining a undried image with each halftone dot rate of 40%, 60%, 80%, and 100% in a region of 10 mm×200 mm.

Immediately after that (specifically, within 5 seconds from the completion of the application of the ink), the permeable substrate is placed on a hot plate at 60° C. in contact with a surface opposite to the image recording surface of the permeable substrate, and hot air at 120° C. is blown onto the image recording surface for 10 seconds using a dryer to dry the undried image, thereby obtaining an image with each halftone dot rate of 40%, 60%, 80%, and 100%.

In the entire region of 10 mm×200 mm, where the image of each halftone dot rate was recorded, the applied mass ratio [treatment liquid/ink] was 0.08 (see Table 1).

Evaluation

The following evaluations were carried out using the above-described treatment liquid and the above-described image.

The results are shown in Table 1.

Coating Unevenness of Treatment Liquid

A dye (IJINKM-003E; manufactured by Fujifilm Corporation) was added to the above-described treatment liquid so as to have a concentration of 3% by mass to obtain a treatment liquid for evaluating coating unevenness.

The treatment liquid for evaluation coating unevenness was applied to the permeable substrate and dried under the same conditions as the application and drying of the treatment liquid in the image recording described above.

After the drying, an application region of the treatment liquid for evaluating coating unevenness on the permeable substrate was visually observed, and the coating unevenness of the treatment liquid was evaluated according to the following evaluation standard.

In the following evaluation standard, the rank at which the coating unevenness of the treatment liquid was most suppressed is 5.

Evaluation Standard for Coating Unevenness of Treatment Liquid

5: no coating unevenness was confirmed.
4: coating unevenness was confirmed, but no streaks were formed.
3: streak-like coating unevenness having a pitch of more than 0 mm and 0.5 mm or less was confirmed.
2: streak-like coating unevenness having a pitch of more than 0.5 mm and 1 mm or less was confirmed.
1: streak-like coating unevenness having a pitch of more than 1 mm was confirmed.

Density Unevenness of Image

The image of each halftone dot rate, recorded by the image recording described above, was visually observed, and the density unevenness of the image was evaluated according to the following evaluation standard.

In the following evaluation standard, the rank at which the density unevenness of the image was most suppressed is 5.

Evaluation Standard for Density Unevenness of Image

5: no density unevenness was confirmed.
4: density unevenness of the image was confirmed in an image having a halftone dot rate of 100%.
3: density unevenness of the image was confirmed in an image having a halftone dot rate of 100% and in an image having a halftone dot rate of 80%.
2: density unevenness of the image was confirmed in an image having a halftone dot rate of 100%, in an image having a halftone dot rate of 80%, and in an image having a halftone dot rate of 60%.
1: density unevenness of the image was confirmed in all images having the halftone dot rates.

Examples 2 to 4 and 13, and Comparative Example 3

The same operations as in Example 1 were carried out, except that, by changing the viscosity (x) of the treatment liquid, the value of "y−25 ln(x)" was changed as shown in Table 1.

The results are shown in Table 1.

The viscosity of the treatment liquid was changed by changing the amount or type of the thickener in the treatment liquid (hereinafter, the same applies).

Regarding the thickener, as Guar gum, Guar gum (number-average molecular weight: 250,000) manufactured by FUJIFILM Wako Pure Chemical Corporation was used. PEG20000 is as described above.

Example 5

The same operations as in Example 1 were carried out, except that, by changing the diameter (y) of the coating roller, the value of "y−25 ln(x)" was changed as shown in Table 1.

The results are shown in Table 1.

Examples 6 to 8 and Comparative Examples 1 and 2

The same operations as in Example 1 were carried out, except that, by changing the viscosity (x) of the treatment liquid the diameter (y) of the coating roller, the value of "y−25 ln(x)" was changed as shown in Table 1.

The results are shown in Table 1.

Examples 9 and 14

The same operation as in Example 3 was carried out, except that the type of the aggregating agent in the treatment liquid was changed as shown in Table 1.

The results are shown in Table 1.

Example 10

The same operations as in Example 3 were carried out, except that the application amount ratio [treatment liquid/ink] was changed as shown in Table 1.

The results are shown in Table 1.

The application amount ratio [treatment liquid/ink] was changed by changing the application amount of the treatment liquid.

Example 11

The same operation as in Example 10 was carried out, except that the type of the aggregating agent in the treatment liquid was changed as shown in Table 1.

The results are shown in Table 1.

Example 12

The same operations as in Example 1 were carried out, except that the water-soluble resin in the ink was changed to resin particles.

The results are shown in Table 1.

As shown in Table 1, in Examples in which, in a case where the diameter of the coating roller (that is, the diameter of the coating roller, expressed in mm unit) was defined as y and the viscosity of the treatment liquid at 25° C., expressed in mPa·s unit, was defined as x, x was 5 to 100 and a value of y−25 ln(x) was 90 to 160, the density unevenness of the image was suppressed.

On the other hand, in Comparative Example 1 in which x was less than 5 and in Comparative Examples 2 and 3 in which the value of y−25 ln(x) was less than 90, the density unevenness of the image could not be suppressed.

From the results of Examples 3 and 9, in a case where the aggregating agent was an organic acid salt (Example 3), it was found that the density unevenness of the image was further suppressed.

From the results of Examples 3 and 10, in a case where the applied mass ratio [treatment liquid/ink] was 0.05 or more (Example 3), it was found that the density unevenness of the image was further suppressed.

Examples using cyan ink as the ink have been described above, but the above-described effect can be obtained in the same way in a case where a multicolor image is recorded by applying two or more colors of ink.

What is claimed is:

1. An image recording method comprising:

a step of applying a treatment liquid containing water and an aggregating agent to a permeable substrate to be transported, with a coating roller; and a step of applying an ink containing water, a water-soluble organic solvent, a colorant, and a resin to a region of the permeable substrate, which has been coated with the treatment liquid, by an ink jet method to record an image,

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Treatment liquid | Aggregating agent | Calcium formate | 5 | 5 | 5 | 5 | 5 | 5 | 5 | 5 | |
| | | Magnesium formate | | | | | | | | | |
| | | Malonic acid | | | | | | | | | 5 |
| | Water-soluble organic solvent | DEGmBE | 2 | 2 | 2 | 2 | 2 | 2 | 2 | 2 | 2 |
| | Thickener | PEG2000 | 1 | 5 | 10 | 15 | 1 | 8 | 10 | 17 | 10 |
| | | Guar gum | | | | | | | | | |
| | | Water | Remaining amount | Remaining amount | Remaining amount | Remaining amount | Remaining amount | Remaining amount | Remaining amount | Remaining amount | Remaining amount |
| Ink | Colorant | PB15:3 | 3 | 3 | 3 | 3 | 3 | 3 | 3 | 3 | 3 |
| | Resin | Pigment dispersion resin | 2 | 2 | 2 | 2<br>3 | 2 | 2 | 2 | 2 | 2 |
| | | Water-soluble resin | 5 | 5 | 5 | 5 | 5 | 5 | 5 | 5 | 5 |
| | | Resin particles | | | | | | | | | |
| | Surfactant | OLFINE E1010 | 1 | 1 | 1 | 1 | 1 | 1 | 1 | 1 | 1 |
| | Water-soluble organic solvent | PG | 20 | 20 | 20 | 20 | 20 | 20 | 20 | 20 | 20 |
| | | Water | Remaining amount | Remaining amount | Remaining amount | Remaining amount | Remaining amount | Remaining amount | Remaining amount | Remaining amount | Remaining amount |
| Viscosity of treatment liquid [mPa·s](=x) | | | 5 | 10 | 45 | 75 | 5 | 30 | 45 | 100 | 45 |
| Diameter of coating roller [mm](=y) | | | 200 | 200 | 200 | 200 | 140 | 180 | 250 | 270 | 200 |
| y − 25ln(x) | | | 160 | 142 | 105 | 92 | 100 | 95 | 155 | 155 | 105 |
| Applied mass ratio (treatment liquid/ink] | | | 0.08 | 0.08 | 0.08 | 0.08 | 0.08 | 0.08 | 0.08 | 0.08 | 0.08 |
| Evaluation result | Coating uneveness of treatment liquid | | 5 | 5 | 5 | 3 | 4 | 4 | 5 | 5 | 3 |
| | Density unevenness of image | | 5 | 5 | 4 | 4 | 4 | 4 | 4 | 4 | 3 |

wherein, in a case where a viscosity of the treatment liquid at 25° C., expressed in mPa·s unit, is defined as x and a diameter of the coating roller, expressed in mm unit, is defined as y, x is 10 to 100 and a value of $y-25\ln(x)$ is 90 to 160.

2. The image recording method according to claim 1, wherein the aggregating agent is an organic acid salt.

3. The image recording method according to claim 2, wherein the organic acid salt is an alkali metal salt of an organic acid or an alkaline earth metal salt of an organic acid.

4. The image recording method according to claim 3, wherein the organic acid is an organic compound having a phosphoric acid group or a carboxy group.

5. The image recording method according to claim 1, wherein the aggregating agent is an organic acid.

6. The image recording method according to claim 5, wherein the organic acid is an organic compound having a phosphoric acid group or a carboxy group.

7. The image recording method according to claim 1, wherein a content of the aggregating agent in the treatment liquid is 0.1% by mass to 30% by mass with respect to the total amount of the treatment liquid.

8. The image recording method according to claim 1, wherein a ratio of an applied mass of the treatment liquid to an applied mass of the ink is 0.05 to 0.50 in the region to which the ink has been applied.

9. The image recording method according to claim 1, wherein the value of $y-25\ln(x)$ is 100 to 160.

10. The image recording method according to claim 1, wherein the water-soluble organic solvent is at least one selected from the group consisting of a diethylene glycol monoalkyl ether, a triethylene glycol monoalkyl ether, a propylene glycol monoalkyl ether, dipropylene glycol, tripropylene glycol, and a tripropylene glycol monoalkyl ether.

11. The image recording method according to claim 1, wherein the permeable substrate includes paper.

12. The image recording method according to claim 1, wherein a transportation speed of the permeable substrate during applying the treatment liquid is 50 m/min or more.

13. The image recording method according to claim 1, wherein x is greater than 10 and less than 100.

* * * * *